(12) United States Patent
Nagano

(10) Patent No.: US 8,041,202 B2
(45) Date of Patent: Oct. 18, 2011

(54) DRIVING DEVICE AND IMAGE PICKUP APPARATUS

(75) Inventor: Kouta Nagano, Osaka (JP)

(73) Assignee: Sony Corporation, Tokyo (JP)

( * ) Notice: Subject to any disclaimer, the term of this patent is extended or adjusted under 35 U.S.C. 154(b) by 363 days.

(21) Appl. No.: 12/216,752

(22) Filed: Jul. 10, 2008

(65) Prior Publication Data

US 2009/0047009 A1 Feb. 19, 2009

(30) Foreign Application Priority Data

Aug. 17, 2007 (JP) ................................. 2007-212838

(51) Int. Cl.
G03B 17/00 (2006.01)

(52) U.S. Cl. ....................... 396/55; 348/208.11; 359/557

(58) Field of Classification Search .................... 396/55; 348/208.11; 359/557
See application file for complete search history.

(56) References Cited

U.S. PATENT DOCUMENTS

| 2003/0067544 | A1* | 4/2003 | Wada | 348/208.7 |
|---|---|---|---|---|
| 2005/0259156 | A1* | 11/2005 | Kosaka et al. | 348/208.7 |
| 2007/0031134 | A1* | 2/2007 | Kuroda et al. | 396/55 |
| 2007/0292119 | A1* | 12/2007 | Lee | 396/55 |
| 2008/0080052 | A1* | 4/2008 | Suzuki | 359/554 |
| 2008/0303907 | A1* | 12/2008 | Lee | 348/208.7 |

FOREIGN PATENT DOCUMENTS

JP 2006-259114 9/2006

* cited by examiner

Primary Examiner — Christopher Mahoney
Assistant Examiner — Fang-Chi Chang
(74) Attorney, Agent, or Firm — Rader, Fishman & Grauer PLLC

(57) ABSTRACT

A driving device includes a fixed section, a holding member, a driving section disposed at the fixed section and having a driving shaft, a first movable body having a bearing section friction-coupled with the driving shaft, a second movable body formed as a body separate from the first movable body and capable of moving in conjunction with the first movable body although not secured to the first moving body, and support means for supporting the second movable body with the fixed section and the holding member so as to allow the movable body to move in a predetermined plane.

11 Claims, 11 Drawing Sheets

DRIVING DEVICE AND IMAGE PICKUP APPARATUS

CROSS REFERENCES TO RELATED APPLICATIONS

The present invention contains subject matter related to Japanese Patent Application JP 2007-212838 filed in the Japanese Patent Office on Aug. 17, 2007, the entire contents of which being incorporated herein by reference.

BACKGROUND OF THE INVENTION

1. Field of the Invention

The present invention relates to a driving technique for moving a movable body using a driving force provided by a driving shaft.

2. Background of the Related Art

Some image pickup apparatus such as digital cameras include a shake compensation unit which shifts the position of an image pickup device to compensate for a shake of a hand during a shooting operation (for example, see JP-A-2006-259114 (Patent Document 1)).

In a common shake compensation unit having an image pickup device shifting mechanism, a driving force is generated by a piezoelectric actuator disposed on a side of an image pickup device to shift the image pickup device in a plane that is perpendicular to the optical axis of the device.

Specifically, the shake compensation unit includes a piezoelectric actuator having a piezoelectric element expanding and contracting according to a voltage applied thereto and a driving shaft extending from the piezoelectric element, a fixed member on which the piezoelectric actuator is provided, and a driven body (which is also referred to as "slider") having an image pickup device provided thereon. The shake compensation unit has a mechanism formed by frictionally coupling a bearing section provided on the slider and the driving shaft of the piezoelectric actuator provided on the fixed member. In the shake compensation unit having such a mechanism, the slider is driven based on a principle that the movement of the slider synchronously follows the driving shaft when the driving shaft is relatively slowly displaced because of the force of the friction coupling and that the slider does not move when the driving shaft is relatively rapidly displaced because of a slip occurring at the friction-coupled region.

SUMMARY OF THE INVENTION

In the shake compensation unit having the above-described mechanism, when the friction-coupled region is worn by friction, the positions of the bearing section and the driving shaft change relative to each other, and the relative positions of the fixed member and the slider in the direction of the optical axis consequently change.

Changes in relative positions similar to those of the fixed member and the slider obviously occur between the image pickup device provided on the slider and the fixed member, and the abrasion of the friction-coupled region results in a change in the distance from the final lens surface of the image pickup optical system to the image pickup plane (the distance is also referred to as "back focus").

In general, a back focus is an important factor affecting the focal point of a lens and is therefore preferably kept unchanged.

It is therefore desirable to provide a technique which makes it possible to reduce adverse effects exerted on a slider by frictional abrasion occurring between a bearing section and a driving shaft.

According to an embodiment of the invention, there is provided a driving device characterized in that it includes a fixed section, a holding member, a driving section disposed at the fixed section and having a driving shaft, a first movable body having a bearing section friction-coupled with the driving shaft, a second movable body formed as a body separate from the first movable body and capable of moving in conjunction with the first movable body although not secured to the first movable body, and support means for supporting the second movable body with the fixed section and the holding member so as to allow the movable body to move in a predetermined plane.

According to another embodiment of the invention, there is provided a driving device characterized in that it includes a fixed section, a holding member, a driving section disposed at the fixed section and having a driving shaft, a first movable body having a bearing section friction-coupled with the driving shaft, a second movable body separated from the first movable body, and support means for supporting the second movable body with the fixed section and the holding member so as to allow the movable body to move in a predetermined plane. The second movable body has a contacted section which comes in contact with the first movable body according to a movement of the first movable body. The second movable body receives a driving force from the first movable body through the contact section.

According to another embodiment of the invention, there is provided an image pickup apparatus including an image pickup device acquiring a photographic image associated with an object image and a driving unit. The driving unit includes a fixed section, a holding member, a driving section disposed at the fixed section and having a driving shaft, a first movable body having a bearing section friction-coupled with the driving shaft, a second movable body capable of moving in conjunction with the first movable body although it is a body separate from the first movable body, and support means for supporting the second movable body with the fixed section and the holding member so as to allow the movable body to move in a predetermined plane. The image pickup device is disposed on the second movable body.

According to the embodiments of the invention, the second movable body capable of moving in a predetermined plane is formed as a body separate from the first movable body having the bearing section friction-coupled with the driving shaft and is not secured on the first movable body. Therefore, the second movable body can be kept less susceptible to the influence of abrasion occurring between the bearing section of the first movable body and the driving shaft.

DETAILED DESCRIPTION OF THE INVENTION

An embodiment of the invention will now be described with reference to the drawings.

External Configuration

Figure 1:
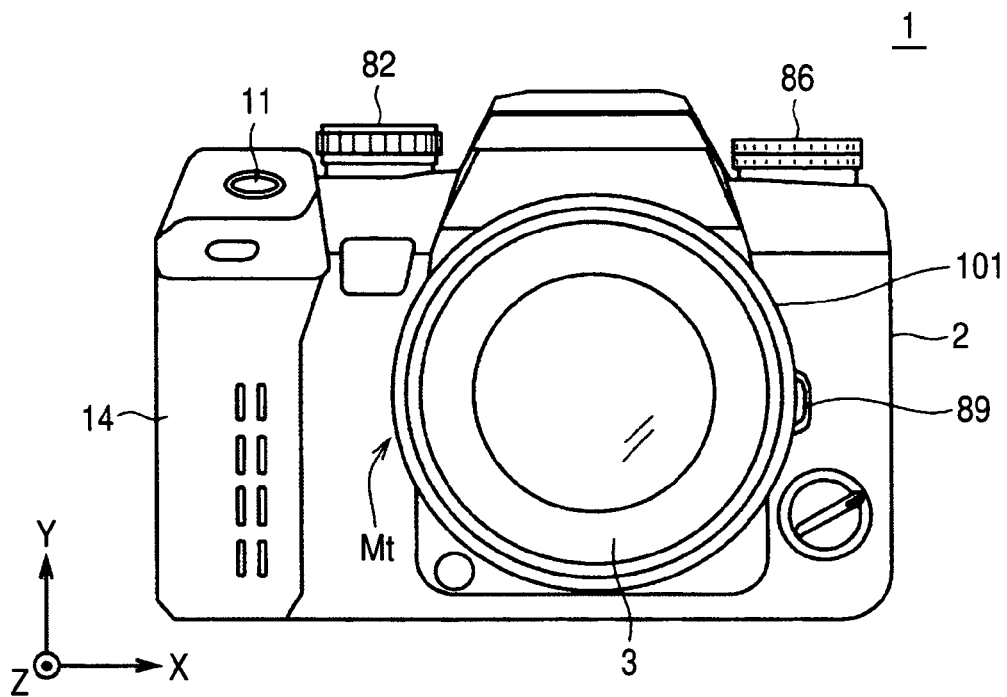
FIG. 1 shows an external configuration of an image pickup apparatus according to an embodiment of the invention.
Figure 2:
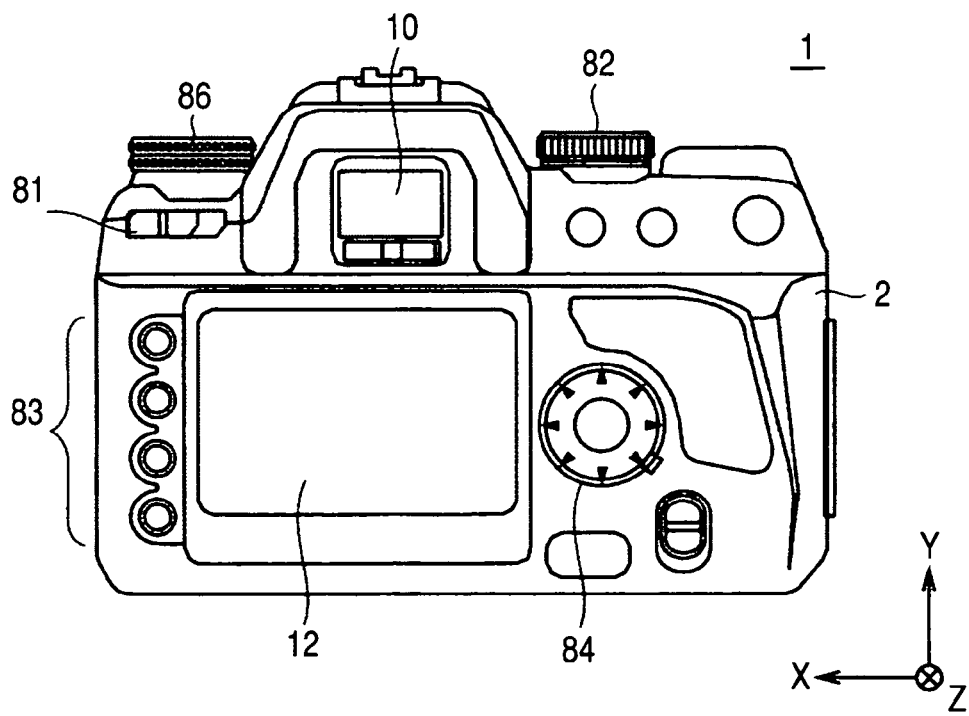
FIG. 2 shows an external configuration of the image pickup apparatus according to the embodiment of the invention.

FIGS. 1 and 2 show an external configuration of an image pickup apparatus 1 according to an embodiment of the invention. FIG. 1 is a front view of the image pickup apparatus 1, and FIG. 2 is a rear view of the image pickup apparatus 1. The image pickup apparatus 1 is a single-lens reflex digital camera having interchangeable lenses.

As shown in FIG. 1, the image pickup apparatus 1 has a camera body 2. An interchangeable photographic lens unit (interchangeable lenses) 3 can be attached and detached to and from the camera body 2.

Major components of the photographic lens unit 3 are a lens barrel 101 and lenses 37 (see FIG. 3) and a diaphragm (not shown) provided in the lens barrel 101. The lenses 37 include a focus lens which moves in directions along the optical axis to change the focal position.

The camera body 2 has an annular mount section Mt for mounting the photographic lens unit 3 provided substantially in the middle of the front side thereof, and an attach/detach button 89 for attaching and detaching the photographic lens unit 3 is provided near the annular mount section Mt.

The camera body 2 has a mode setting dial 82 provided in a top left part of the front side thereof and a control value setting dial 86 provided in a top right part of the front side. Various modes of the camera (including various shooting modes (a portrait shooting mode, a landscape shooting mode, and a continuous shooting mode), a reproduction mode for reproducing a photographed image, and a communication mode for exchanging data with external apparatus) can be set (switched) by operating the mode setting dial 82. Control values for the various shooting modes can be set by operating the control value setting dial 86.

The camera body 2 also includes a grip section 14 to be gripped by a photographer provided at a left end of the front side thereof. A release button 11 for instructing the starting of exposure is provided on a top surface of the grip section 14. A battery chamber and a card chamber are provided in the grip section 14. For example, four LR6 dry cells to serve as a power supply of the camera are contained in the battery chamber, and a memory card for recording image data of photographed images is removably contained in the card chamber.

The release button 11 is a two-step detection button which can be detected to be in two states, i.e., a half-pressed state (state S1) and a full-pressed state (state S2). When the release button 11 is half-pressed to enter the state S1, preparatory operations for acquiring a still image (a photographic image) to be recorded from an object (e.g., an AF control operation and an AE control operation) are performed. When the release button 11 is further pressed to enter the state 2, operations of taking the photographic image (a series of operations including an operation of exposing an image of the object using an image pickup device 15 (to be described later) and an operation of performing a predetermined image process on an image signal obtained by the exposure operation) are performed.

Referring to FIG. 2, a rear side monitor 12 is provided substantially in the middle of the rear side of the camera body 2. For example, the rear side monitor 12 is a color liquid crystal display (LCD). The rear side monitor 12 can display a menu screen for setting shooting conditions and reproduce a photographic image recorded in the memory card in the reproduction mode.

A finder window 10 is provided at a top part substantially in the middle of the rear side. An object image from the photographic lens unit 3 is guided to the finder window 10, and the photographer can view an image that is equivalent to the object image acquired by the image pickup device 15 by looking at the finder window 10.

Specifically, the object image incident upon the photographic optical system is reflected upward by a mirror mechanism 103 (see FIG. 3) to be viewed through an ocular lens 106. Thus, the photographer can decide an image composition by looking at the finder window 10. When a final photographic image is taken, the mirror mechanism 103 retracts from the optical path of the light forming the object image, and the light from the photographic lens unit 3 (the light forming the object image) reaches the image pickup device 15. Thus, a photographic image (image data) of the object is obtained.

A main switch 81 is provided near the left side of the body and above the rear side monitor 12. The main switch 81 is a two-position slide switch. When the contact is placed in an "OFF" position in the left side of the switch, the power supply is turned off. When the contact is placed in an "ON" position in the right side of the switch, the power supply is turned on.

A direction select key 84 is provided on the right side of the rear side monitor 12. The direction select key 84 includes a circular operation button, and operations of pressing positions of this operation button, representing four directions, i.e., upward, downward, leftward, and rightward directions, are detected. Operations of pressing positions representing other four directions, i.e., upper-right, upper-left, lower-right, and lower-left directions, are also detected. In addition to the pressing operations indicating eight directions, an operation of pressing a push button in the middle of the direction select key 84 is also detected.

A plurality of setting buttons 83 for operations such as setting a menu screen and deleting an image are provided on the left side of the rear side monitor 12.

Figure 3:
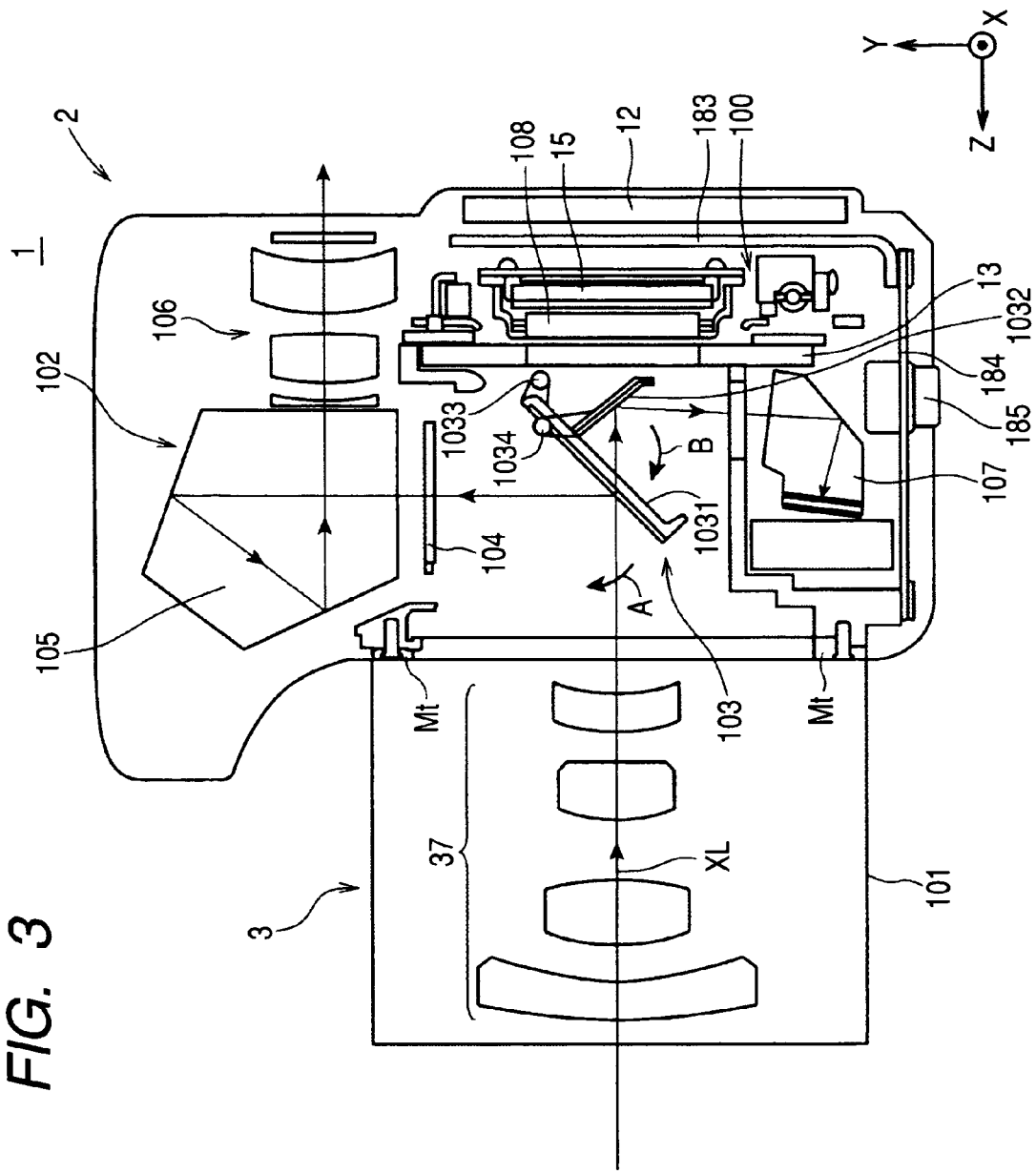
FIG. 3 is a vertical sectional view of the image pickup apparatus.
Figure 4:
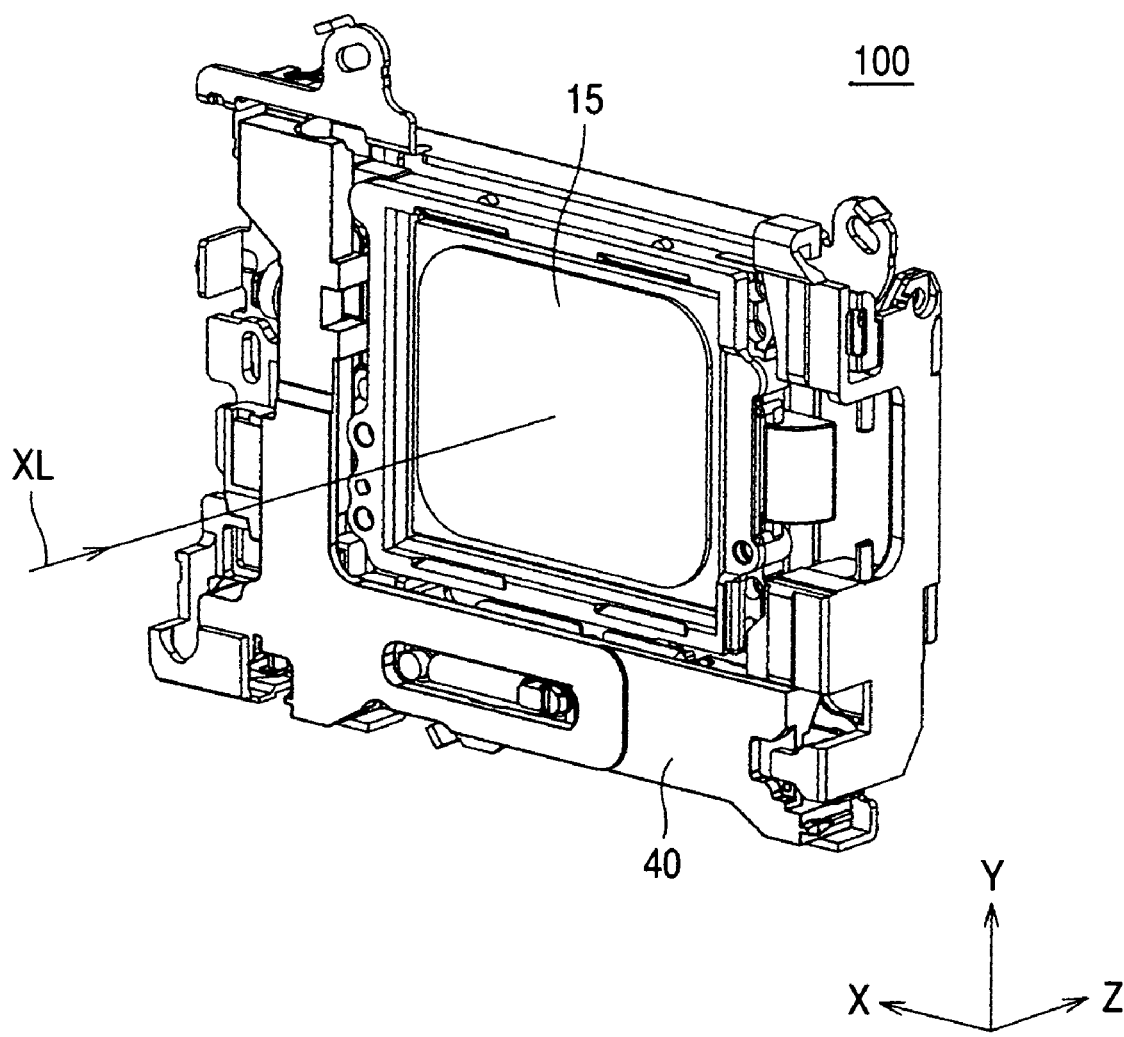
FIG. 4 is an external perspective view of a shake compensation unit.

An internal configuration of the image pickup apparatus 1 will now be described. FIG. 3 is a vertical sectional view of the image pickup apparatus 1. FIG. 4 is an external perspective view of the shake compensation unit 100.

As shown in FIG. 3, the image pickup device 15, the finder section 102 (finder optical system), the mirror mechanism 103, a focus detecting section 107, the shake compensation unit 100, and a shutter unit 13 are provided in the image pickup apparatus 1.

When the photographic lens unit 3 is attached to the image pickup apparatus 1, the image pickup device (image pickup sensor) 15 is disposed on an optical axis XL of the lenses 37 provided in the photographic lens unit 3 so as to extend in a plane perpendicular to the optical axis XL. Thus, the device generates an image signal associated with an image of an object. Details of the device will be described later.

The mirror mechanism 103 (reflector) is disposed in a position on the optical axis XL to reflect object light toward the finder section 102. The object light which has passed through the photographic lens unit 3 is reflected upward by the mirror mechanism 103 (a main mirror 1031 which will be described later) to form an image on a focal plate 104 (pint glass). A part of the object light which has passed through the photographic lens unit 3 is transmitted through the mirror mechanism 103.

The finder section 102 includes a pentaprism 105, the ocular lens 106, and the finder window 10. The pentaprism 105 is a prism which has a pentagonal sectional shape and which reflects an object image incident thereon through a bottom surface thereof to convert the light image into an erected image by inverting the same vertically and laterally. The ocular lens 106 guides the object image, which has been converted into an erected image by the pentaprism 105, out of the finder window 10. The finder section 102 having such a configuration serves as an optical finder for checking an object field in preparation for shooting.

The mirror mechanism 103 includes a main mirror 1031 and a sub mirror 1032. The sub mirror 1032 is disposed on the rear side of the main mirror 1031 such that it can be rotated toward a rear surface of the main mirror 1031. A part of object light transmitted through the main mirror 1031 is reflected by the sub mirror 1032, and the reflected object light impinges upon the focus detecting section 107.

The mirror mechanism 103 is formed as a so-called quick return mirror. When exposure is performed, the mechanism springs up about a rotary shaft 1033 serving as a fulcrum as indicated by arrow A and stops in a position under the focus plate 104. At this time, the sub mirror 1032 rotates about a rotary shaft 1034 serving as a fulcrum in the direction indicated by arrow B toward the rear surface of the main mirror 1031. When the mirror mechanism 103 stops in the position under the focus plate 104, the sub mirror is retracted to a position where it is substantially in parallel with the main mirror 1031. As a result, object light from the photographic lens unit 3 reaches the image pickup device 15 without being blocked by the mirror mechanism 103, and the image pickup device 15 is exposed to the light. When exposure is finished, the mirror mechanism 103 returns to the initial position (the position shown in FIG. 3).

The focus detecting section 107 is a so-called AF sensor which includes a distance measuring element for detecting focus information of an object. The focus detecting section 107 is disposed under the mirror mechanism 103 to detect a position in focus using, for example, the well-known phase difference detection method.

As shown in FIG. 4, a shake compensation unit 100 (a shake mechanism) is formed by the image pickup device 15, a first slider 40 which will be described later, and a piezoelectric actuator serving as a driving section. Specifically, the actuator is driven based on shake information detected by a gyro unit (not shown) in the image pickup apparatus 1 to slide the image pickup device 15 up and down (along a Y-axis) and to the left and right (along an x-axis), whereby compensation is provided for a shake of a hand. Details of the structure and operations of the shake compensation unit 100 will be described later.

A low-pass filter 108 is disposed immediately upstream of the image pickup device 15 when viewed on the optical axis of the device to prevent infrared light from entering and to prevent the generation of pseudo colors or color moirés. The shutter unit 13 is disposed immediately upstream of the low pass filter 108. The shutter unit 13 is a mechanical focal plane shutter which includes a diaphragm moving up and down to open and close the optical path of object light guided to the image pickup device 15 along the optical axis XL.

The above-described components of the image pickup apparatus 1 are coupled (secured) to each other by a chassis made of a metal such as iron. In the present embodiment, the chassis is shown as having a front chassis (not shown), a rear chassis 183, and a bottom chassis 184 by way of example. Those chassis serve as support members for supporting the above-described components in the image pickup apparatus 1. A tripod mount 185 is provided on the bottom chassis 184.

Shake Compensation Unit
(Configuration of Shake Compensation Unit)

Figure 5:
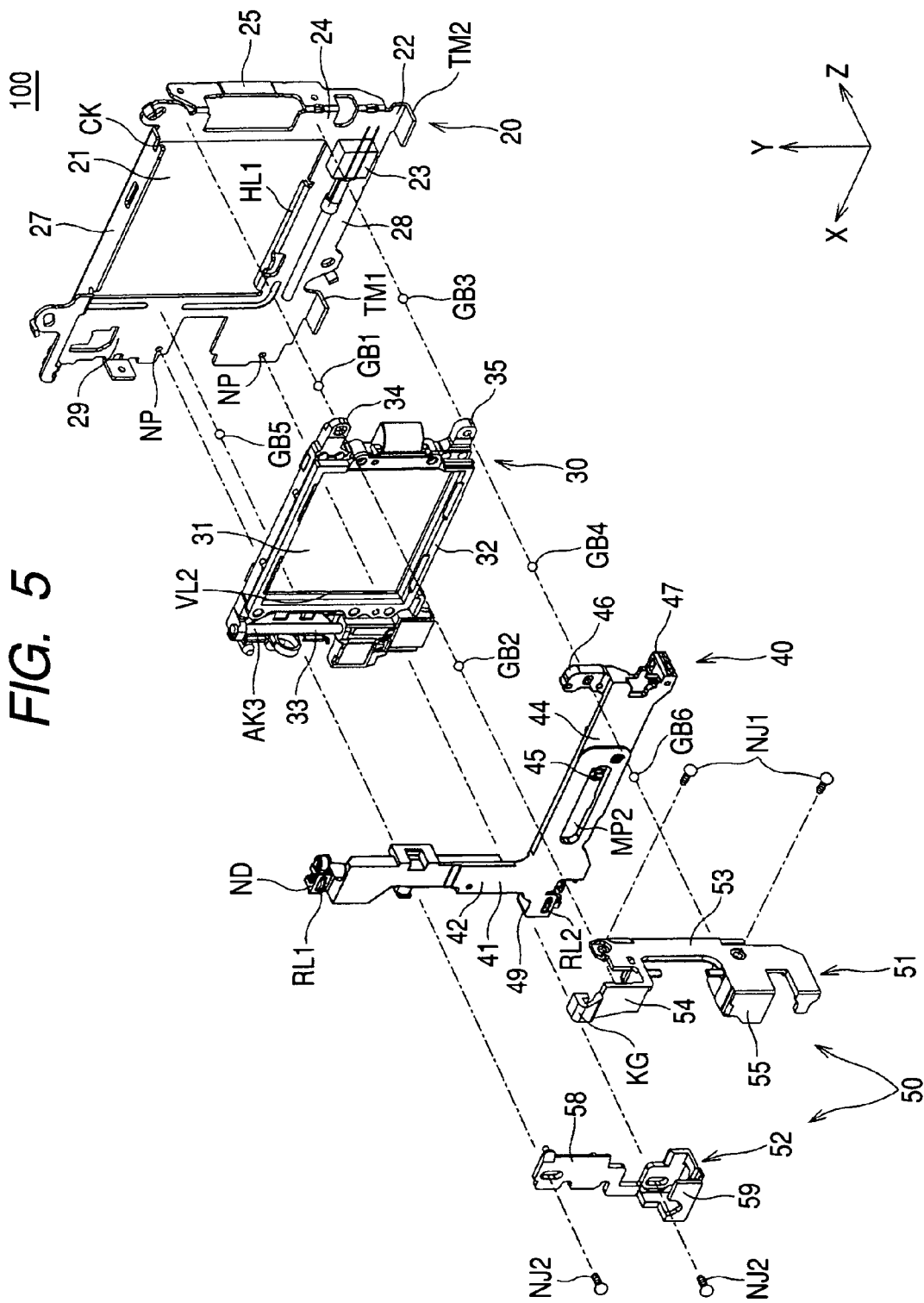
FIG. 5 is an exploded perspective view schematically showing a configuration of the shake compensation unit.
Figure 6:
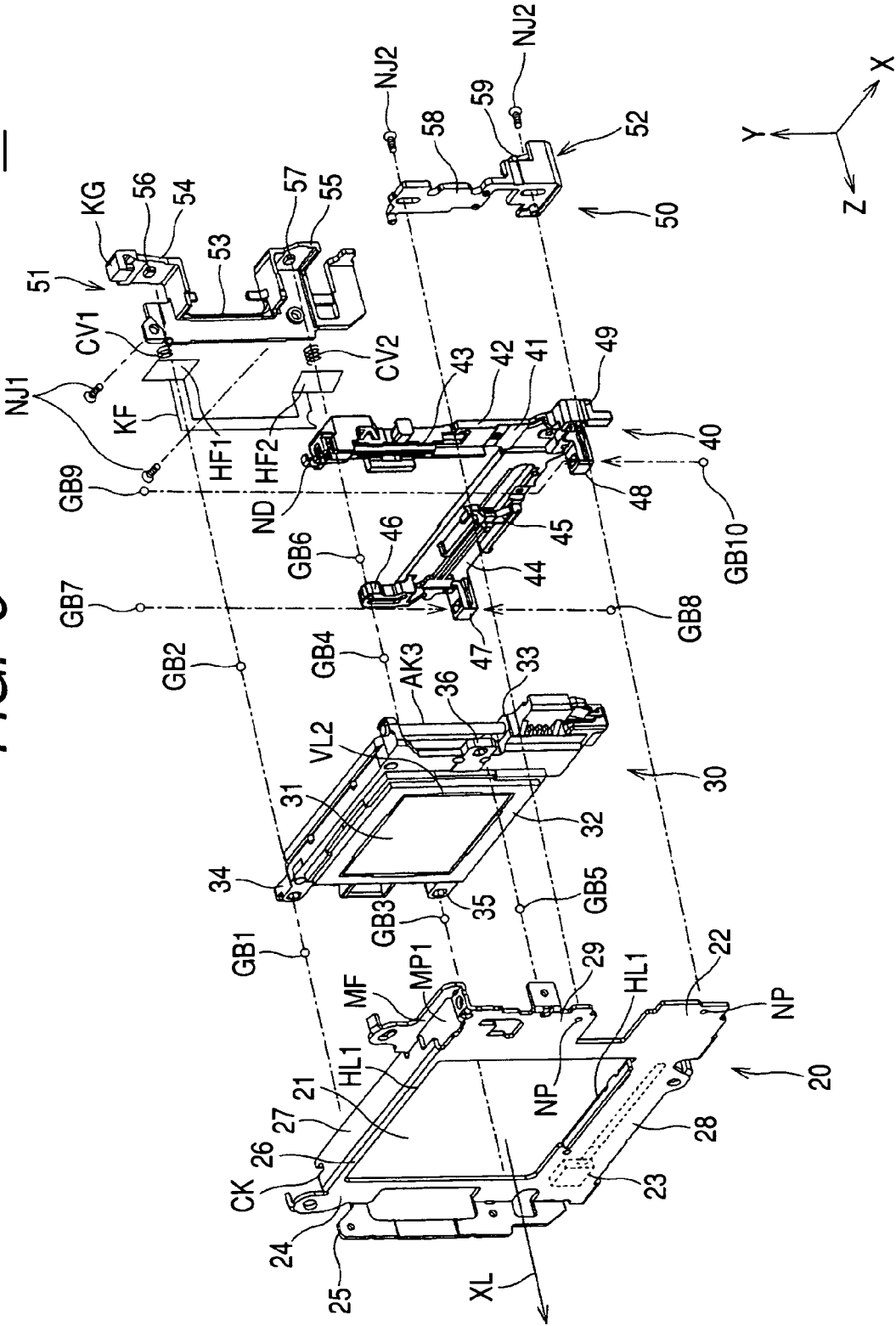
FIG. 6 is an exploded perspective view schematically showing a configuration of the shake compensation unit.
Figure 7:
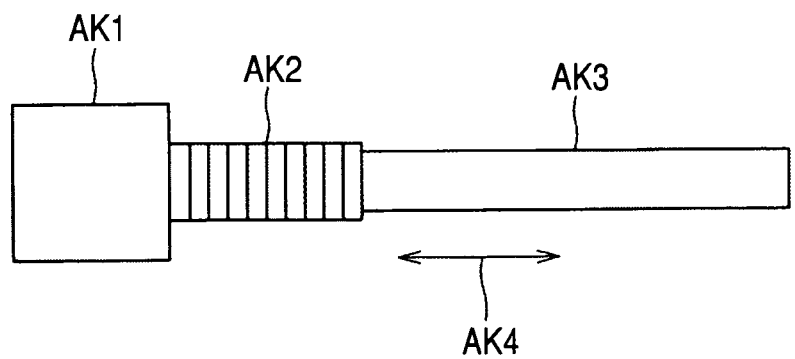
FIG. 7 shows a piezoelectric actuator.
Figure 8:
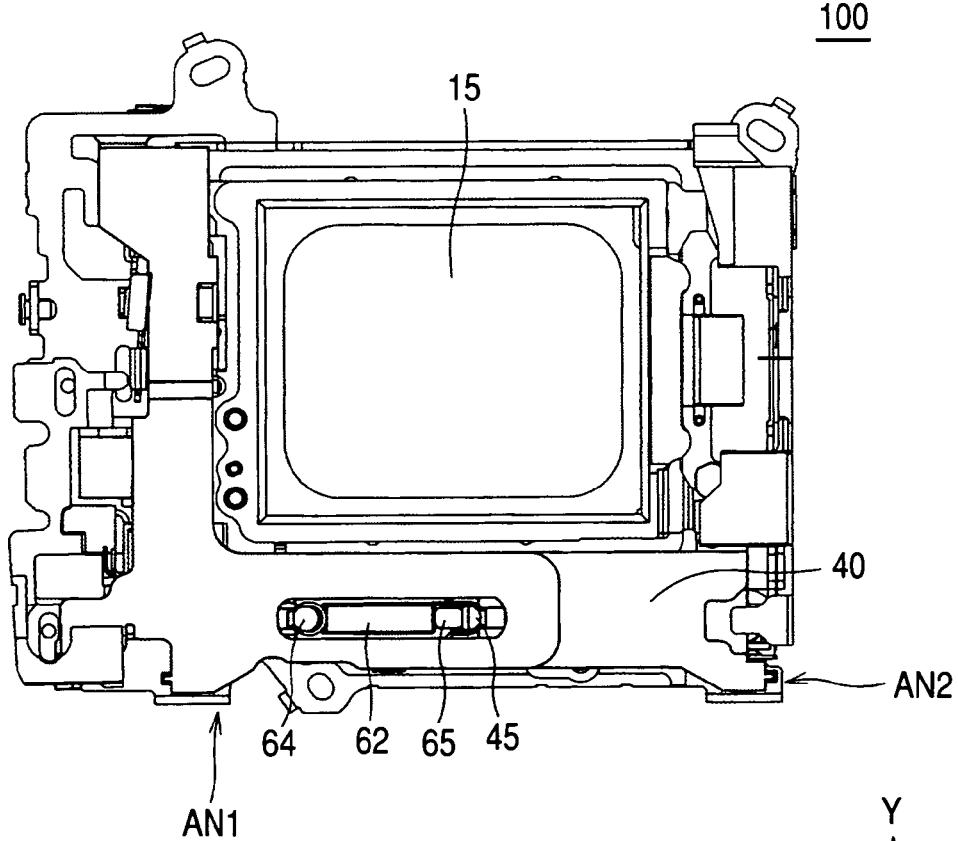
FIG. 8 is a front view of the shake compensation unit.
Figure 9:
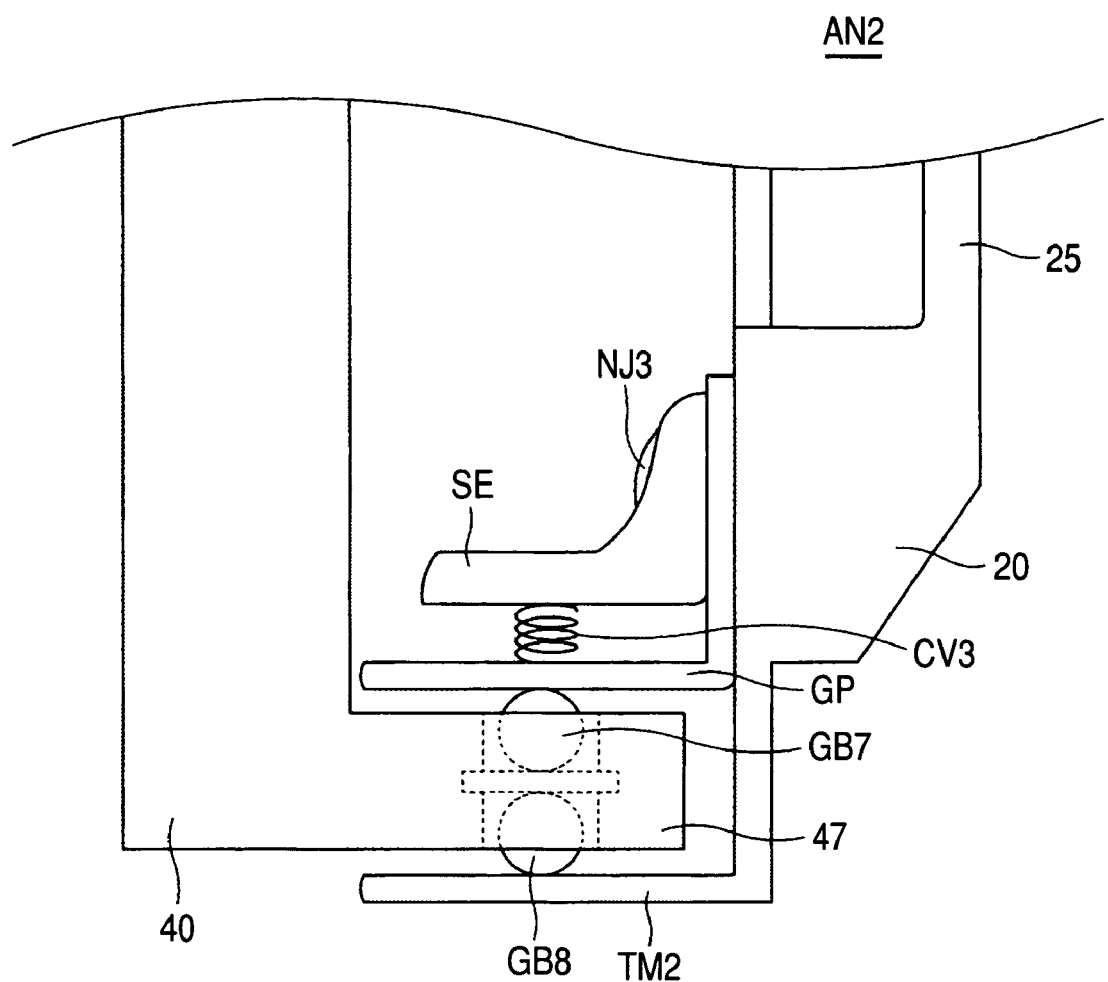
FIG. 9 is an enlarged view of a guide portion taken in a negative X-direction.

A configuration of the shake compensation unit 100 of the image pickup apparatus 1 will now be described. FIGS. 5 and 6 are exploded perspective views of the shake compensation unit 100 schematically showing a configuration of the shake compensation unit 100. FIG. 5 is an exploded perspective view taken from the front side of the shake compensation unit 100, and FIG. 6 is an exploded perspective view taken from the rear side of the shake compensation unit 100. FIG. 7 shows piezoelectric actuators 23 and 33. FIG. 8 is a front view of the shake compensation unit 100. FIG. 9 is an enlarged view of a guide portion AN2 taken in a negative X direction.

As shown in FIGS. 5 and 6, the shake compensation unit 100 includes a base plate (also referred to as "holding substrate") 20, a first slider 40 which moves in directions along the X-axis relative to the base plate 20, a second slider (also referred to as "image pickup device holder") 30 which moves in directions along the Y-axis relative to the first slider, and a holding member 50. The shake compensation unit 100 is configured to sandwich the first slider 40 and the second slider 30 as movable members in positive and negative Z directions (two directions along the optical axis XL) using the base plate 20 and the holding member 50 as fixed bodies, and the unit therefore operates as a driving device for moving a movable body relative to a fixed body.

Specifically, the base plate 20 is formed from a rectangular annular metal sheet (metal frame) 22 having a rectangular opening 21 substantially in the middle thereof, and the plate serves as a fixing substrate for mounting the shake compensation unit 100 in the image pickup apparatus 1.

A mount member 25 for securing a first holding member 51, which will be described later, is provided at an outer edge of a vertical frame (also referred to as "right side frame") 24 forming a part of the metal frame 22 located on the right side thereof (a negative X side with reference to the optical axis XL). An upright bent plate 27 is provided on a horizontal frame (also referred to as "top side frame") 26 (see FIG. 6) forming a part of the metal frame 22 located on the top side thereof (a positive Y side with reference to the optical axis XL), the plate 27 having a cutout CK to be engaged with the first holding member 51 and an opening MP1 to be fitted with a part of the first slider 40. A yaw-direction actuator 23 is provided on a horizontal frame (also referred to as "bottom side frame") 28 forming a part of the metal frame 22 located on the bottom side thereof (a negative Y side with reference to the optical axis XL) so as to extend along a horizontal edge part HL1 of the opening 21 (so as to extend in the X-axis direction) A screw hole NP for securing a second holding member 52, which will be described later, is provided on a vertical frame (also referred to as "left side frame) 29 forming a part of the metal frame 22 located on the left side thereof (a positive X side with reference to the optical axis XL).

The second slider 30 is based on a frame body 32 made of resin having a rectangular opening 31 substantially in the middle thereof to allow the image pickup device 15 to be accommodated and secured therein. A rigid ball bearing 34 is provided at a top end of a right edge of the frame body 32, rigid balls GB1 and GB2 being slackly fitted in the bearing on two respective sides thereof perpendicular to the Z-axis. A rigid ball bearing 35 is provided at a bottom end of the right edge of the frame body 32, rigid balls GB3 and GB4 being slackly fitted in the bearing on two respective sides thereof perpendicular to the Z-axis. A pitch-direction actuator 33 is provided on a left edge of the frame body 32 so as to extend along a vertical edge part VL2 of the opening 31 (so as to extend in a Y-axis direction). A rigid ball bearing 36 (FIG. 6) is provided substantially in the middle of the left edge of the frame body 32, a rigid ball GB5 being slackly fitted in the bearing on one side thereof perpendicular to the Z-axis (specifically, the side of the bearing perpendicular to the Z-axis and facing in the positive Z direction).

The piezoelectric actuators 23 and 33 provided in the shake compensation unit 100 will now be described in detail. As shown in FIG. 7, each of the yaw-direction actuator 23 and the pitch-direction actuator 33 includes a multi-layer piezoelectric element AK2 obtained by stacking layers of ceramics in the form of a rod, a rectangular stationary member AK1 connected to one end of the piezoelectric element AK2 in the stacking direction thereof, and a driving rod (also referred to as "driving shaft") AK3 made of carbon connected to the other end of the element AK2 in the stacking direction thereof. The piezoelectric element AK2 has the property of expanding and contracting in the stacking direction according to a voltage applied thereto. Therefore, in the piezoelectric actuators 23 and 33 having the above-described structure, the driving shafts AK3 move in the stacking direction (directions indicated by AK4 in FIG. 7).

The description will now be continued with reference to FIGS. 5 and 6 again. The first slider 40 is formed based on an L-shaped frame made of resin (also referred to as "L-frame") 41 including a frame 42 extending in the positive Y direction (hereinafter also referred to as "vertical frame") and a frame 44 extending in the negative X direction (hereinafter also referred to as "horizontal frame"). A bearing section (also referred to as "friction coupling section") 43 (FIG. 6) is secured to aside of the vertical frame 42 facing in the positive Z direction, the bearing section being formed with a V-shaped groove that is slidably fitted with the driving shaft AK3 of the pitch-direction actuator 33. The friction coupling section 43 is provided in a position where it faces the driving shaft AK3 of the pitch-direction actuator 33 of the second slider 30. A fitting section ND to be fitted in the opening MP1 of the base plate 20 is provided at the extending end of the vertical frame 42. The horizontal frame 44 has a rectangular opening MP2 (FIG. 5) substantially in the middle thereof, the opening MP2 being longer in the X-axis direction. A member 45 movable across the opening MP2 is provided at the end of the opening MP2 on the negative X side thereof. The member 45 serves as a driving force receiving section (which may be also simply referred to as "receiving section") for receiving a driving force from the yaw-direction actuator 23. The horizontal frame 44 has a rigid ball bearing 46 provided at the extending end thereof, rigid balls GB4 and GB6 being slackly fitted in the bearing on two respective sides thereof perpendicular to the Z-axis.

The L-frame 41 has protrusions protruding in the positive Z direction from two respective ends of a bottom edge of the horizontal frame 44. The protrusions are provided with respective rigid ball bearings, i.e., a rigid ball bearing 47 in which rigid balls GB7 and GB8 are slackly fitted on two respective sides thereof perpendicular to the Y-axis and a rigid ball bearing 48 in which rigid balls GB9 and GB10 are slackly fitted on two respective sides thereof perpendicular to the Y-axis. When the base plate 20 and the first slider 40 are combined together, the rigid ball bearings 47 and 48 form a guide portion which guides the first slider 40 in a yaw direction (an X-axis direction). Thus, the first slider 40 can be slid in an X-axis direction according to a driving force received from the yaw-direction actuator 23 through the driving force receiving section 45. Details of the guide portion for X-axis directions will be described later.

The holding member 50 includes a first holding member 51 and a second holding member 52, and the member has the function of urging a movable body against the base plate 20.

Specifically, the first holding member 51 includes a first member 53 made of resin as a base material, coil springs CV1 and CV2, and a metal body KF having two rigid ball bearing sheets HF1 and HF2, as shown in FIG. 6. The first member 53 includes substantially rectangular pressing sections 54 and 55 for sandwiching movable bodies (the first slider 40 and the second slider 30) in cooperation with the base plate 20, and spring mounts 56 and 57 in the form of protrusions are provided at the pressing sections 54 and 55. The coil springs CV1 and CV2 are mounted on the spring mounts 56 and 57, respectively, such that the protruding direction of the spring mounts 56 and 57 agrees with the extending direction of the coil springs CV1 and CV2. The metal body KF is disposed on the first member 53 such that the rigid ball bearing sheets HF1 and HF2 of the metal body KF will press the coil springs CV1 and CV2 in the direction of compressing the coil springs CV1 and CV2 or such that the coil springs CV1 and CV2 will be compressed by the rigid ball bearing sheets HF1 and HF2.

The second holding member 52 is a member made of resin, and it includes a fixed sheet 58 which is fixed to the base plate 20 by screws NJ2 and a pressing sheet 59 pressing the movable body in the positive Z direction. Specifically, when the fixed sheet 58 is fixed to the base plate 20, a corner section 49 of the first slider 40 protruding outward (in the positive X direction) at the bent part of the first slider 40 exists between the fixed sheet 58 and the pressing sheet 59, and the corner section 49 is pressed in the positive Z direction by the pressing sheet 59.

When the shake compensation unit 100 is assembled, the image pickup device 15 is fitted and secured in the opening 31 of the second slider 30, and the driving shaft AK3 of the pitch-direction actuator 33 and the friction coupling section 43 of the first slider 40 are friction-coupled. As a result, the second slider 30 enters a state in which it is held on the first slider 40 (held state), and the second slider 30 can slide in a pitch direction (a Y-axis direction) relative to the first slider 40 according to the driving force from the pitch-direction actuator 33. In this held state, the rigid ball bearing 46 provided at the extending end of the horizontal frame 44 of the first slider 40 and the rigid ball bearing 35 provided on the frame body 32 of the second slider 30 are in contact with each other through the rigid ball GB4. Since the first slider 40 and the second slider 30 are in contact with each other through a ball bearing as described above, the second slider 30 can smoothly slide in a Y-axis direction.

When the movable body assembled as described above is mounted on the base plate 20, the fitting section ND of the movable body is fitted in the opening MP1 of the base plate 20, and the second holding member is secured to the base plate 20 by the screws NJ2 with the corner section 49 of the movable body sandwiched between the fixed sheet 58 and the pressing sheet 59 of the second holding member 52. The first holding member 51 is secured to the mount member 25 of the base plate 20 by screws NJ1 with a hooked engaging section KG provided adjacent to the pressing section 54 engaged with the cutout CK.

When the movable body is assembled as thus described (an assembled state), the right end of the movable body is sandwiched between the first holding member 51 and the right side frame 24 of the base plate 20 at two points. Specifically, in the assembled state, the rigid ball bearing 34 located at the top of the right end of the movable body (the second slider 30) is held by an urging force of the coil spring CV1 while being sandwiched between the right side frame 24 and the rigid ball bearing sheet HF1 of the first holding member 51 with the respective rigid balls GB1 and GB2 interposed. The rigid ball bearings 35 and 46 located at the bottom of the right end of the movable body and adjoining each other with the rigid ball GB4 interposed are held by an urging force of the coil spring CV2 while being sandwiched between the right side frame 24 and the rigid ball bearing sheet HF2 of the first holding member 51 with the respective rigid balls BG3 and GB4 interposed.

In the assembled state, the left end of the movable body is sandwiched between the second holding member 52 and the left side frame 29 of the base plate 20. Specifically, the corner section 49 located at the bottom of the left end of the movable body is held by a force in the positive Z direction received from the pressing sheet 59 of the second holding member 52 with the fitting section ND located at the top of the left end of the movable body fitted in the opening MP1 of the base plate 20. In the same state, the rigid ball bearing 36 located in the middle of the left end of the movable body is held by a force in the negative Z direction received from the left side frame 29 through the rigid ball GB5.

The shake compensation unit 100 includes rollers RL1 and RL2 incorporated in the fitting section ND and the corner section 49, respectively (see FIG. 5). It is therefore possible to reduce frictional forces generated between the corner section 49 and the pressing sheet 59 and between the fitting section ND and an edge MF of the opening MP1 (an edge defining the opening) when the movable body is shifted in an X-axis direction.

As described above, the movable body is sandwiched by the base plate 20 and the holding member 50, and the side of the movable body facing in the positive Z direction is in contact with the base plate 20 through the three rigid balls (three ball bearings of the second slider 30). The side of the movable body facing in the negative X direction is in contact with the holding member 50 through the roller RL2 at the corner section 49 of the first slider 40, the ball bearing of the second slier 30, and the ball bearing of the first slider 40. In the shake compensation unit 100 having such a movable body holding mechanism, the position of the movable body relative to the base plate 20 that is a fixed substrate in the direction of the optical axis is determined by the three ball bearings facing in the positive Z direction.

Since the movable body contacts the fixed bodies through the ball bearings and the rollers, the movable body can be smoothly shifted in yaw-directions (X-axis directions) and pitch directions (Y-axis directions).

As shown in FIG. 5, the base plate 20 has upright bent parts TM1 and TM2 extending in the negative Z direction provided at the ends of the bottom edge of the bottom side frame 28. In the assembled state (see FIG. 8), the upright bent parts TM1 and TM2 form guide portions AN1 and AN2 in combination with a rigid ball pressing plate GP (FIG. 9) which will be described later. A configuration of the guide portions will be discussed in the following description which will primarily address the guide portion AN2. The guide portion AN1 is similar in configuration to the guide portion AN2.

Specifically, the rigid ball pressing plate GP is mounted on the base plate 20 such that it can slide in Y-axis directions while sandwiching an elastic member expandable in Y-axis directions (which is a coil spring CV3 in the this case) in cooperation with a stopper section SE secured to the base plate 20 with a screw NJ3. When the base plate 20 and the first slider 40 are assembled together, the rigid ball bearing 47 of the first slider 40 is fitted into a gap between the rigid ball pressing plate GP and the upright bent part TM2 formed by temporarily pushing up the rigid ball pressing plate GP in the positive Y direction. As a result, in the assembled state, the rigid ball bearing 47 of the first slider 40 receives a force acting in the negative Y direction from the rigid ball pressing plate GP. Thus, the bearing 47 is sandwiched between the rigid ball pressing plate GP and the upright bent part TM2 through the rigid balls GB7 and GB8.

By providing the guide portions AN1 and AN2 having such a configuration, movements of the first slider 40 in Y-axis directions can be suppressed by the resilient force of the coil spring. Thus, the first slider 40 can smoothly slide in X-axis directions without shifting (moving) in Y-axis directions.

The second slider 30 has no guide portion for guiding slides in pitch directions for the following reason. To cope with movements in pitch-directions, a configuration is employed, in which the driving shaft AK3 of the pitch-direction actuator 33 is gripped by the friction coupling section provided on the first slider 40. Thus, the driving shaft AK3 of the pitch-direction actuator 33 also serves as guide means for guiding linear movements of the second slider 30 in Y-axis directions.

(Shifting of the Movable Body in Yaw Directions)

Figure 10:
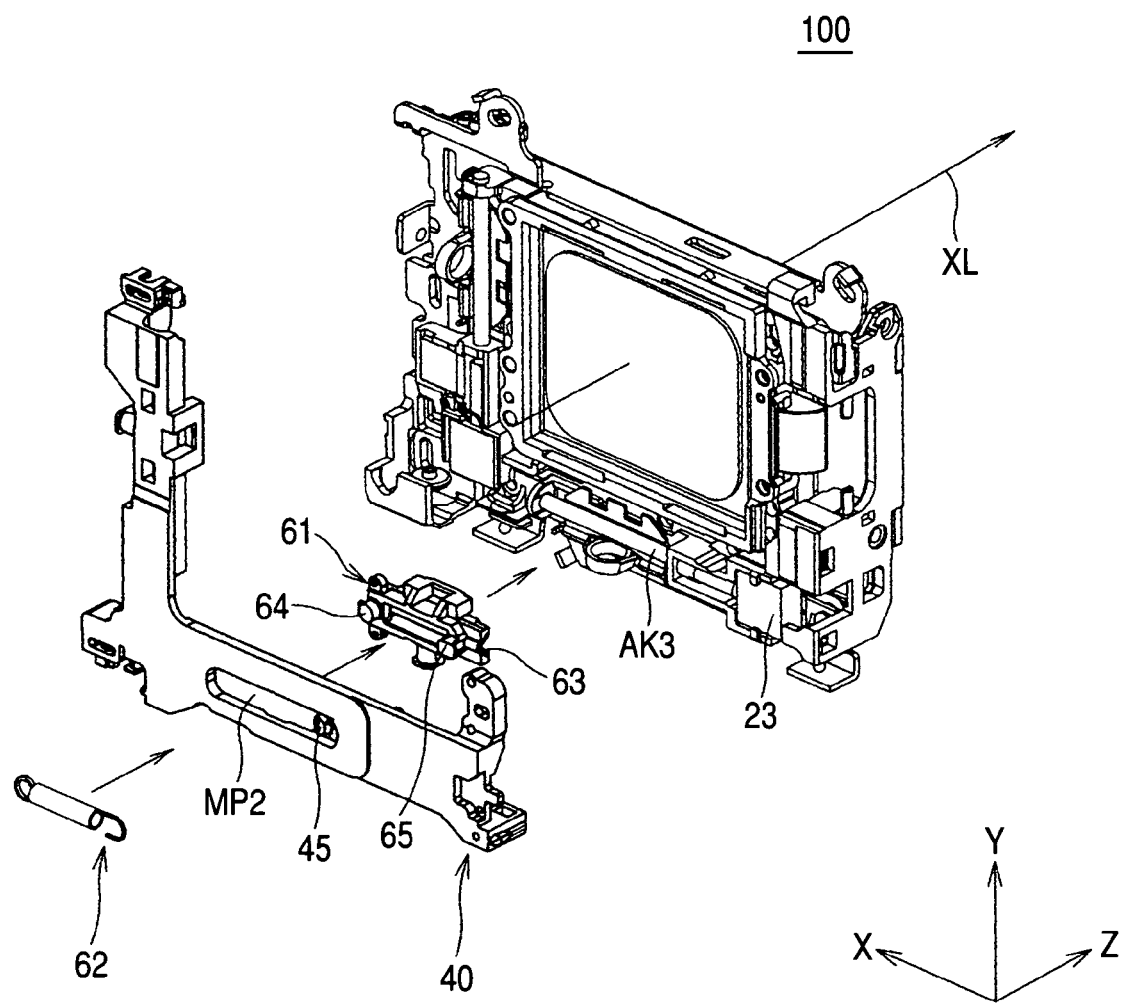
FIG. 10 is an exploded perspective view of a driving force transmitting mechanism.
Figure 11:
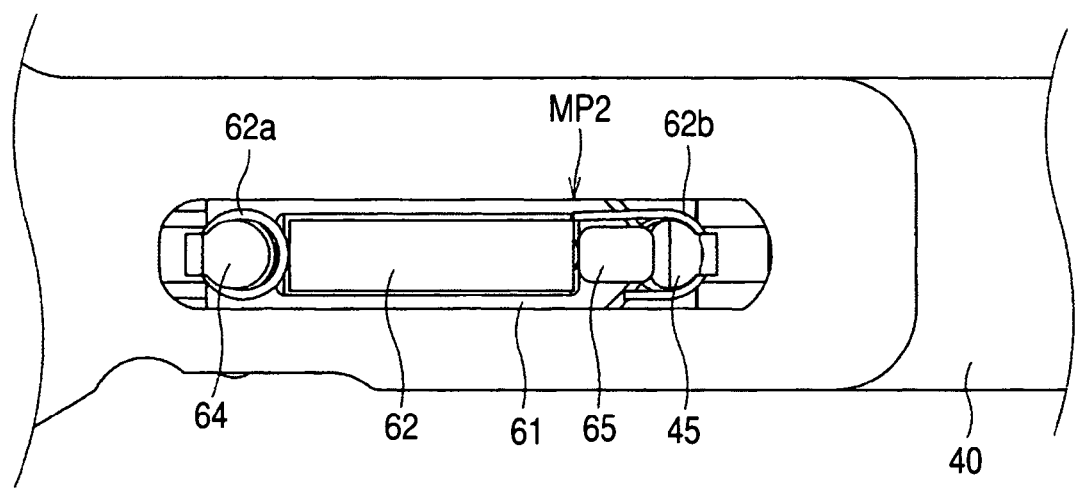
FIG. 11 is an enlarged external view of the driving force transmitting mechanism.
Figure 11:
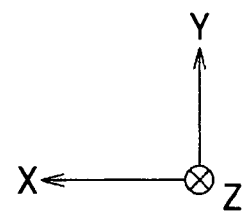

Shifting of the movable body of the shake compensation unit 100 in yaw directions will now be described. FIG. 10 is an exploded perspective view of a driving force transmitting mechanism. FIG. 11 is an enlarged external view of the driving force transmitting mechanism.

As described above, the yaw-direction actuator 23 generates a driving force which shifts the movable body in a yaw direction (the force is also referred to as "yaw-direction driving force"). The yaw-direction driving force is transmitted to the first slider 40 through a movable section 61 friction-coupled to the driving shaft AK3 of the yaw-direction actuator 23.

Specifically, as shown in FIG. 10, the shake compensation unit 100 includes the movable section 61 and urging means (which is a coil spring in this embodiment) 62 constituting a driving force transmitting section.

The movable section 61 includes a bearing section (friction coupling section) 63 in the form of a V-shaped groove, and the friction coupling section 63 is slidably fitted to the driving shaft AK3 of the yaw-direction actuator 23. As a result, the movable section 61 is held by the driving shaft AK3 of the yaw-direction actuator 23, and the movable section 61 slides on the driving shaft AK 3 according to the expansion and contraction of the piezoelectric element AK2.

The movable section 61 also includes an anchoring protrusion 64 and a driving force transmitting section 65 for transmitting a driving force to the first slider 40 (which may be simply referred to as "transmitting section"), provided on the side of the movable section 61 opposite to the side where the friction coupling section 63 is provided. The anchoring protrusion 64 is provided in such a position that a vector going from the driving force transmitting section 65 to the anchoring protrusion 64 is in parallel with the X-axis. In the assembled state (see FIG. 8) in which the first slider 40 is fitted in place, the anchoring protrusion 64 and the driving force transmitting section 65 are fitted in the opening MP2 of the first slider 40.

As shown in FIG. 11, in such an assembled state, the driving force transmitting section 65 is disposed adjacent to the driving force receiving section 45 of the first slider 40 on the positive X side of the section 45. As a result, the driving force receiving section 45 receives a force acting in the negative X direction from the driving force transmitting section 65 when the movable section 61 moves in the negative X direction, and the first slider 40 slides in the negative X direction.

When the movable section 61 is fitted in the opening MP2 of the first slider 40, the movable section 61 and the driving force receiving section 45 are urged by the urging means. Specifically, as shown in FIG. 11, a spring end section 62a on one side of the coil spring 62 is anchored on the anchoring protrusion 64 of the movable section 61, and a spring end section 62b on the other side is anchored on the driving force receiving section 45 of the first slider 40. As thus described, the coil spring 62 is stretched between the anchoring protrusion 64 and the driving force receiving section 45, and the movable section 61 is urged by the urging force of the coil spring 62 in the direction of causing the driving force transmitting section 65 and the driving force receiving section 45 (first slider 40) approach each other. When the movable section 61 moves in the positive X-direction, the driving force receiving section 45 receives a force acting in the positive X-direction through the coil spring 62, and the first slider 40 slides in the positive X-direction. As thus described, by urging the movable section 61 and the first slider 40 with the urging means, the first slider 40 can slide also in the positive X-direction, and accurate movements in X-axis directions can be achieved.

As described above, in the shake compensation unit 100, a driving force generated by the yaw-direction actuator 23 is transmitted to the driving force receiving section 45 through the driving force transmitting section 65 and the urging means of the movable section 61, and the first slider 40 consequently slides in an X-axis direction.

COMPARISON WITH COMPARATIVE EXAMPLE

Figure 12:
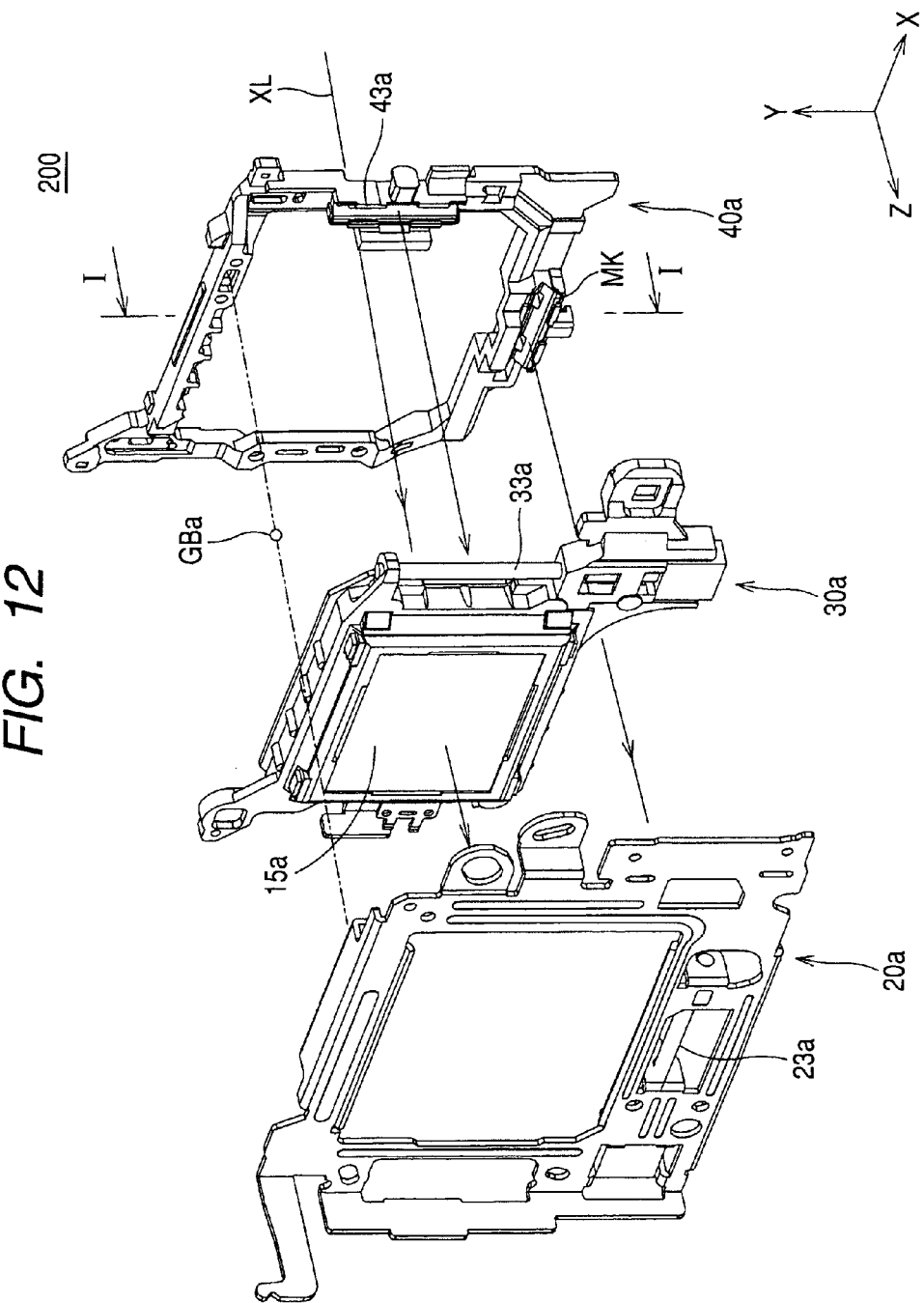
FIG. 12 is an exploded perspective view schematically showing a configuration of a shake compensation unit according to a comparative example.
Figure 13:
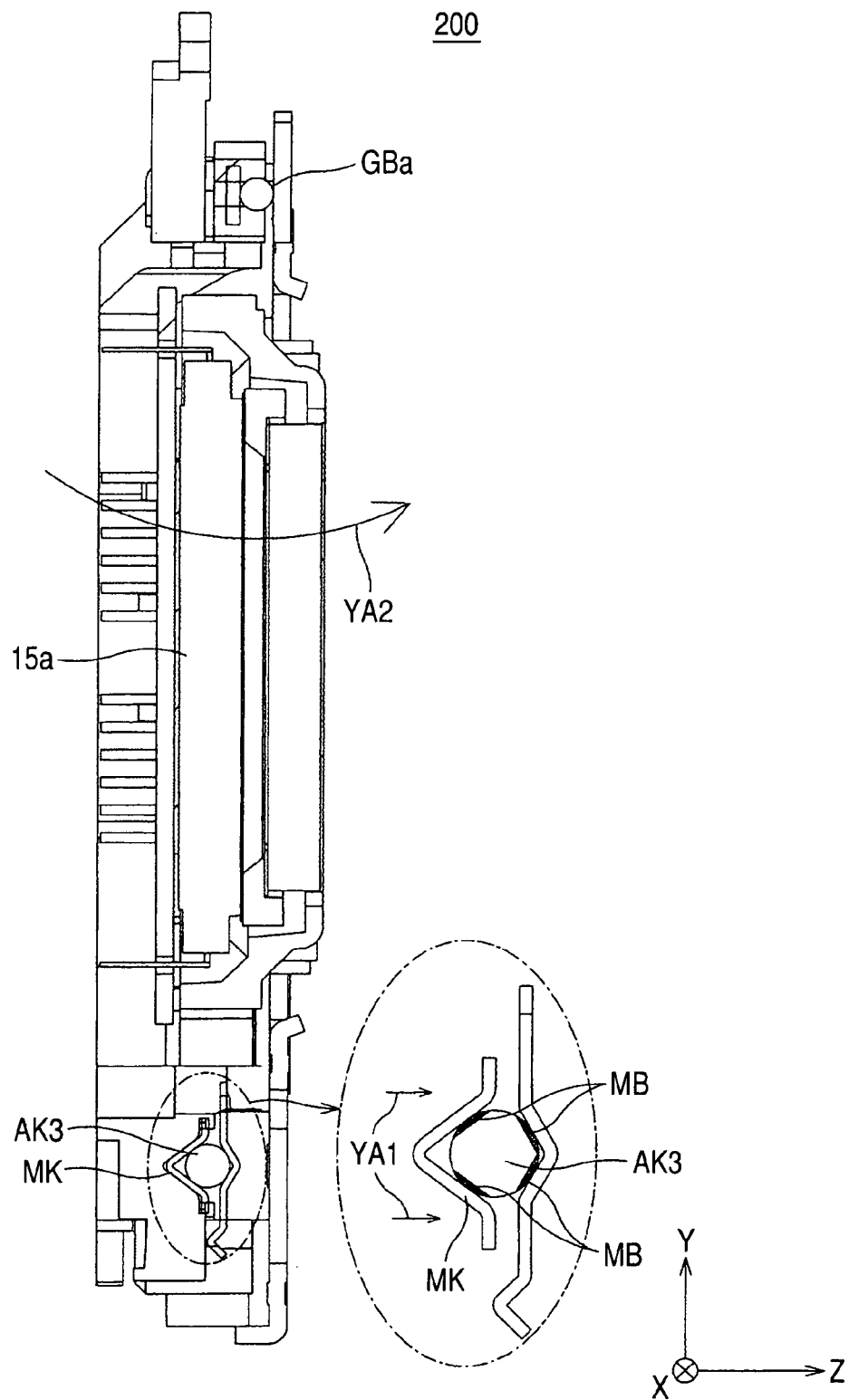
FIG. 13 is a sectional view taken along the line I-I in FIG. 12.

A comparison will now be made between the shake compensation unit 100 of the present embodiment and a shake compensation unit 200 of a comparative example EX according to the related art as described below. FIG. 12 is an exploded perspective view of the shake compensation unit 200 schematically showing a configuration of the same. FIG. 13 is a sectional view of the unit taken along the line I-I in FIG. 12 showing how the shake compensation unit 200 of the comparative example EX is assembled and mounted in an image pickup apparatus 1.

As shown in FIG. 12, the shake compensation unit 200 of the comparative example EX includes a base plate 20a, a first slider 40a, and a second slider 30a. The shake compensation unit 200 is different from the shake compensation unit 100 of the embodiment in that the first slider 40a includes a friction coupling section MK for a yaw-direction actuator 23a.

When the shake compensation unit 200 is assembled, a friction coupling section 43a similar to that used with the pitch-direction actuator 33 is slidably fitted to a driving shaft AK3 of a pitch-direction actuator 33a, and a friction coupling section MK similar to that used with the yaw-direction actuator 23 is slidably fitted to a driving shaft AK3 of a yaw-direction actuator 23a. That is, the shake compensation unit 200 employs a configuration in which the driving shaft AK3 of the yaw-direction actuator 23a is directly gripped by the friction coupling section MK provided on the first slider 40a. As a result, in the shake compensation unit 200, the position of a movable body (the first slider 40a and the second slider 30a) relative to the base plate 20a, which is a fixed substrate, in the direction of the optical axis is determined (limited) by the friction coupling section MK friction-coupled to the driving shaft AK3 and one ball bearing which bears a rigid ball GBa.

The shake compensation unit 200 having such a configuration may have aging in the form of abrasion of the driving shaft AK3 after the unit is driven for a long cumulative driving time. Specifically, since the shake compensation unit 200 employs a configuration in which the driving shaft AK3 is directly gripped by the friction coupling section MK, the driving shaft AK3 of the yaw-direction actuator 23 may be worn by sliding movements of the friction coupling section MK after the unit is driven for a long cumulative driving time. For example, as shown in FIG. 13, the driving shaft AK3 may have a worn part MB (the hatched part in the figure). When such abrasion occurs, the friction coupling section MK that is urged in the positive Z direction to press the driving shaft AK3 moves in the direction (positive Z direction) indicated by arrow YA1, and the position of the movable body in the direction of the optical axis consequently changes in the direction indicated by arrow YA2.

One important factor affecting the focus of a lens in a photographic optical system when the lens is focused at infinity is the distance from the position of the glass part of the lens closest to a photographic plane (the position is also referred to as "lens final surface") to the photographic plane as measured on the optical axis (the distance is also referred to as "back focus"). It is therefore desirable that no change occurs in the distance as time passes.

However, in the shake compensation unit 200 of the comparative example EX, the position of the movable body in the direction of the optical axis changes with time because of abrasion of the driving shaft AK3, as described above. As a result, the position of an image pickup device 15a provided on the movable body changes accordingly in the direction of the optical axis, and a change in the back focus consequently occurs.

On the contrary, in the shake compensation unit 100 of the present embodiment, the first slider 40 is separated from the friction coupling section 63 holding the driving shaft AK3 of the yaw-direction actuator 23, and the position of the movable body (the first slider 40 and the second slider 30) relative to the base plate 20 serving as a fixed substrate in the direction of the optical axis is limited by three ball bearings. Therefore, the position of the movable body in the direction of the optical axis is not affected by abrasion of the driving shaft AK3, and no change therefore occurs in the position of the movable body.

In the shake compensation unit 200 of the comparative example EX, the position of the movable body relative to the fixed substrate in the direction of the optical axis is determined by the friction coupling section MK that is friction-coupled with the driving shaft AK3. It is therefore preferable that the yaw-direction actuator 23 and the friction coupling section MK have high component accuracy or mounting accuracy in order to set the position of the movable body accurately in the direction of the optical axis. On the contrary, in the shake compensation unit 100 of the present embodiment, the first slider 40 is separated from the friction coupling section 63 holding the driving shaft AK3 of the yaw-direction actuator 23. Therefore, the position of the movable body in the direction of the optical axis is less affected by the component accuracy or mounting accuracy of the yaw-direction actuator 23 and the friction coupling section 63 (movable section 61). That is, the component accuracy or mounting accuracy of the yaw-direction actuator 23 and the movable section 61 of the shake compensation unit 100 may be more relaxed.

As described above, the shake compensation unit 100 of the present embodiment includes the piezoelectric actuator 23 disposed on the base plate 20 and having the driving shaft AK3, the movable section 61 having the bearing section 63 friction-coupled to the driving shaft AK3, the first slider 40 formed separately from the movable body 61 and capable of moving in conjunction with the first movable body although not secured to the first movable body, and support means for supporting the first slider 40 in a predetermined plane using the base plate 20 and the holding member 50.

The first slider 40 capable of moving in a predetermined plane is formed separately from the movable section 61 having the bearing section 63 friction-coupled with the driving shaft AK3 and is not secured to the first movable body. Therefore, the first slider 40 can be kept less susceptible to the influence of abrasion occurring between the bearing potion 63 of the movable 61 and the driving shaft AK3.

The shake compensation unit 100 further includes the guide portions AN1 and AN2 which suppress movements of the first slider 40 in Y-axis directions. As a result, the movable body can be accurately shifted in X-axis directions even when there is a relative angular error, more specifically, when the direction of a movement of the movable section 61 in the X-Y plane includes a relative deviation in an X-axis direction.

The shake compensation unit 100 has a configuration in which the first slider 40 is separated from the friction coupling section 63 holding the driving shaft AK3 of the yaw-direction actuator 23, and the movement of the movable body in the direction of the optical axis is limited by the three rigid balls (spherical bodies) interposed between the fixed substrate and the movable body. As a result, even when the direction of a movement of the movable section 61 includes a relative deviation in an X-axis direction, the position of the movable body in the direction of the optical axis can be kept unchanged in shifting the moving body. The number of the rigid balls disposed between the fixed substrate and the movable body is not limited to three, and four or more balls may alternatively be provided. That is, it is desirable to provide at least three ball bearings.

In the shake compensation unit 100, it is possible to suppress a force applied to the piezoelectric element AK2 of the yaw-direction actuator 23 when the image pickup apparatus 1 is shocked, e.g., when it is dropped.

Specifically, the shake compensation unit 100 has a configuration in which the first slider 40 is separated from the friction coupling section 63 for the yaw-direction actuator 23, and the driving force transmitting section 65 of the movable section 61 is disposed to adjoin the driving force receiving section 45 of the first slider 40 in an X-axis direction. In the shake compensation unit 100 having such a configuration, when the movable section 61 moves, the displacement in the X-axis direction is transmitted from the driving force transmitting section 65 to the driving force receiving section 45.

As thus described, the shake compensation unit 100 includes a mechanism in which a force in an X-axis direction is mutually exerted between components of the unit such as the movable body 61 and the first slider 40. However, the unit includes no mechanism for mutual exertion of a force in a Y-axis or Z-axis direction. Therefore, components in Y- and Z-directions of a force generated in the movable body due to a shock such as a drop are hardly transmitted to the driving shaft AK3 of the yaw-direction actuator 23 through the movable section 61. It is therefore possible to suppress a force exerted on the piezoelectric element AK2 of the yaw-direction actuator 23 when the apparatus is shocked.

The piezoelectric element AK2 is less resistant to a force applied in a direction perpendicular to the stacking direction of the element than to a force applied in the stacking direction. Therefore, the piezoelectric element AK2 of the shake compensation unit 100 has high endurance to shocks because it has the mechanism which suppresses transmission of a force in a direction perpendicular to the stacking direction (a Y-axis or Z-axis direction).

Modification

The invention is not limited to the contents of the above description of the embodiment of the same.

For example, although the image pickup device 15 is disposed on the movable body (more specifically, the second slider 30) in the above-described embodiment, the invention is not limited to such a configuration.

Specifically, a lens-shift type shake compensation unit 100 may be provided, in which a lens for shake compensation (compensation lens) is disposed on a movable body to correct the optical axis by shifting the compensation lens.

It should be understood by those skilled in the art that various modifications, combinations, sub-combinations, and alterations may occur depending on design requirements and other factors insofar as they are within the scope of the appended claims or the equivalents thereof.

What is claimed is:

1. A driving device comprising:
a fixed section;
a holding member;
a driving section disposed at the fixed section and having a driving shaft;
a first movable body having a bearing section friction-coupled with the driving shaft;
a second movable body formed as a body separate from the first movable body and capable of moving in conjunction with the first movable body although not secured to the first moving body; and
support means for supporting the second movable body with the fixed section and the holding member so as to allow the first movable body and the second movable body to move in a predetermined plane,
wherein the second movable body is disposed between the fixed section and the first movable body and the first movable body is disposed between the holding member and the second movable body and
wherein, with the fixed section, the holding member, the first movable body and the second movable body operably connected together, a first ball bearing, a second ball bearing and a third ball bearing are disposed between and in contact with the fixed section and the second movable body, a fourth bearing is disposed between and in contact with the first movable body and the second movable body, a fifth ball bearing is disposed between and in contact with the holding member and the second movable body and a sixth ball bearing is disposed between and in contact with the holding member and the first movable body.

2. A driving device according to claim 1, wherein the fixed section includes a guide portion guiding the second movable body in a predetermined direction in the predetermined plane.

3. A driving device according to claim 1, wherein:
the first movable body includes a contacting section contacting a contacted section provided on the second movable body;

the contacting section and the contacted section are disposed so as to adjoin each other in a predetermined direction in the predetermined plane; and the contacting section transmits a displacement in the predetermined direction to the contacted section according to a movement of the first movable body.

4. A driving device according to claim 1, wherein the support means includes limiting means for limiting movement of the second movable body in a direction perpendicular to the predetermined plane.

5. A driving device according to claim 4, wherein the limiting means limits the movement of the second movable body in the perpendicular direction with at least three spherical bodies interposed between the fixed section and the second movable body.

6. A driving device according to claim 4, further comprising urging means for urging the first movable body against the second movable body in a predetermined direction in the predetermined plane.

7. A driving device comprising:
a fixed section;
a holding member;
a driving section disposed at the fixed section and having a driving shaft;
a first movable body having a bearing section friction-coupled with the driving shaft;
a second movable body separated from the first movable body; and
support means for supporting the second movable body with the fixed section and the holding member so as to allow the first movable body and the second movable body to move in a predetermined plane, wherein
the second movable body has a contacted section coming in contact with the first movable body according to a movement of the first movable body, and
the second movable body receives a driving force from the first movable body through the contacted section,
wherein the second movable body is disposed between the fixed section and the first movable body and the first movable body is disposed between the holding member and the second movable body and
wherein, with the fixed section, the holding member, the first movable body and the second movable body operably connected together, a first ball bearing, a second ball bearing and a third ball bearing are disposed between and in contact with the fixed section and the second movable body, a fourth bearing is disposed between and in contact with the first movable body and the second movable body, a fifth ball bearing is disposed between and in contact with the holding member and the second movable body and a sixth ball bearing is disposed between and in contact with the holding member and the first movable body.

8. An image pickup apparatus comprising:
an image pickup device acquiring a photographic image associated with an object image; and
a driving unit,
the driving unit including:
a fixed section;
a holding member;
a driving section disposed at the fixed section and having a driving shaft;
a first movable body having a bearing section friction-coupled with the driving shaft;
a second movable body capable of moving in conjunction with the first movable body although it is a body separate from the first movable body; and
support means for supporting the second movable body with the fixed section and the holding member so as to allow the first movable body and the second movable body to move in a predetermined plane,
the image pickup device being disposed on the second movable body,
wherein the second movable body is disposed between the fixed section and the first movable body and the first movable body is disposed between the holding member and the second movable body and
wherein, with the fixed section, the holding member, the first movable body and the second movable body operably connected together, a first ball bearing, a second ball bearing and a third ball bearing are disposed between and in contact with the fixed section and the second movable body, a fourth bearing is disposed between and in contact with the first movable body and the second movable body, a fifth ball bearing is disposed between and in contact with the holding member and the second movable body and a sixth ball bearing is disposed between and in contact with the holding member and the first movable body.

9. A driving device comprising:
a fixed section;
a holding member;
a driving section disposed at the fixed section and having a driving shaft;
a first movable body having a bearing section friction-coupled with the driving shaft;
a second movable body formed as a body separate from the first movable body and capable of moving in conjunction with the first movable body although not secured to the first moving body; and
a support unit configured to support the second movable body with the fixed section and the holding member so as to allow the first movable body and the second movable body to move in a predetermined plane,
wherein the second movable body is disposed between the fixed section and the first movable body and the first movable body is disposed between the holding member and the second movable body and
wherein, with the fixed section, the holding member, the first movable body and the second movable body operably connected together, a first ball bearing, a second ball bearing and a third ball bearing are disposed between and in contact with the fixed section and the second movable body, a fourth bearing is disposed between and in contact with the first movable body and the second movable body, a fifth ball bearing is disposed between and in contact with the holding member and the second movable body and a sixth ball bearing is disposed between and in contact with the holding member and the first movable body.

10. A driving device comprising:
a fixed section;
a holding member;
a driving section disposed at the fixed section and having a driving shaft;
a first movable body having a bearing section friction-coupled with the driving shaft;
a second movable body separated from the first movable body; and
a support unit configured to support the second movable body with the fixed section and the holding member so as to allow the first movable body and the second movable body to move in a predetermined plane, wherein the second movable body has a contacted section coming in contact with the first movable body according to a movement of the first movable body, the second movable body receives a driving force from the first movable body through the contacted section and the second movable body is disposed between the fixed section and the first movable body and the first movable body is disposed between the holding member and the second movable body and wherein, with the fixed section, the holding member, the first movable body and the second movable body operably connected together, a first ball bearing, a second ball bearing and a third ball bearing are disposed between and in contact with the fixed section and the second movable body, a fourth bearing is disposed between and in contact with the first movable body and the second movable body, a fifth ball bearing is disposed between and in contact with the holding member and the second movable body and a sixth ball bearing is disposed between and in contact with the holding member and the first movable body.

11. An image pickup apparatus comprising:

an image pickup device acquiring a photographic image associated with an object image; and a driving unit, the driving unit including:

a fixed section;

a holding member;

a driving section disposed at the fixed section and having a driving shaft;

a first movable body having a bearing section friction-coupled with the driving shaft;

a second movable body capable of moving in conjunction with the first movable body although it is a body separate from the first movable body; and a support unit configured to support the second movable body with the fixed section and the holding member so as to allow the first movable body and the second movable body to move in a predetermined plane, the image pickup device being disposed on the second movable body, wherein the second movable body is disposed between the fixed section and the first movable body and the first movable body is disposed between the holding member and the second movable body and wherein, with the fixed section, the holding member, the first movable body and the second movable body operably connected together, a first ball bearing, a second ball bearing and a third ball bearing are disposed between and in contact with the fixed section and the second movable body, a fourth bearing is disposed between and in contact with the first movable body and the second movable body, a fifth ball bearing is disposed between and in contact with the holding member and the second movable body and a sixth ball hearing is disposed between and in contact with the holding member and the first movable body.

* * * * *